Patented May 20, 1941

2,242,581

UNITED STATES PATENT OFFICE 2,242,581

ARYL ARSINE OXIDES

Walter Herrmann and Friedrich Hampe, Frankfort-on-the-Main-Hochst, Germany, assignors to Winthrop Chemical Company, Inc., New York, N. Y., a corporation of New York No Drawing. Application April 26, 1939, Serial No. 270,156. In Germany April 29, 1938

2 Claims. (Cl. 260—300)

The present invention relates to new aryl arsine oxides and to a process of preparing them.

Aryl arsine oxides have already been included for a long time past into the sphere of chemotherapeutic investigations. In recent times it has also been proposed to use the 3-amino-4-hydroxybenzene arsine oxide, known for a long time, for curing protozoa-diseases.

We have found that the 2-mercaptobenzimidazole-4-arsine oxide of the formula

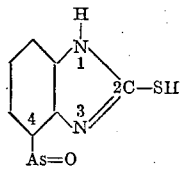

and the 2-mercaptobenzimidazole-5-arsine oxide of the formula

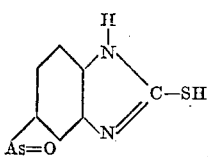

have a surprisingly high activity exceeding all the hitherto known arsine oxides. The dosis tolerata per 20 grams of the weight of a mouse injected intravenously is, for instance, for 2-mercaptobenzimidazole-5-arsine oxide and for 3-amino-4-hydroxybenzene arsine oxide (which is known to be especially active) 0.2 milligram. The dosis curativa in the case of trypanosoma (the stock Provatschek) is 0.005 milligram for 2-mercaptobenzimidazole-5-arsine oxide whereas 0.02 milligram of 3-amino-4-hydroxybenzene arsine oxide are necessary for attaining the same effect. In the case of rabbit syphilis the 2-mercaptobenzimidazole-4-arsine oxide has, with nearly the same compatability, about three times as great a curative effect as the known 3-amino-4-hydroxybenzene arsine oxide.

The arsine oxides are obtained by reducing the arsenic acids in manner itself known, for instance with sulfur dioxide with or without the addition of hydriodic acid, or with phenylhydrazine.

The following example serves to illustrate the invention, but it is not intended to limit it thereto:

27.4 grams of 2-mercaptobenzimidazole-5-arsonic acid are dissolved in 130 cc. of water with addition of 7.5 cc. of caustic soda solution of 42° Bé. A solution of 10 grams of potassium iodide in 20 cc. of water and then 260 cc. of sulfuric acid (1 to 5) are added to this solution. Sulfurous acid is then introduced without regard to any precipitation which may occur, until saturation has occurred. The whole is then filtered and washed with a large quantity of water and the precipitate is dried. The 2-mercaptobenzimidazole-5-arsine oxide is a white powder readily soluble in acids and alkalis.

The corresponding 2-mercaptobenzimidazole-4-arsine oxide is obtained in the same manner by starting from 2-mercaptobenzimidazole-4-arsonic acid.

We claim:

1. A spirocheticidal and trypanosomicidal composition prepared for therapeutic use in a form of sufficient purity, comprising a compound of the class consisting of the two compounds of the following formula:

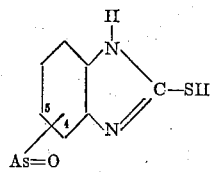

wherein the arsenic containing radical stands in a position of the group consisting of the 4- and 5-positions.

2. A spirocheticidal and trypanosomicidal composition prepared for therapeutic use in a form of sufficient purity comprising a compound of the following formula:

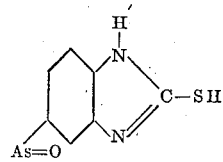

WALTER HERRMANN.
FRIEDRICH HAMPE.